United States Patent
Seder et al.

(10) Patent No.: US 8,774,833 B2
(45) Date of Patent: Jul. 8, 2014

(54) NAVIGATION SYSTEM DESTINATION ENTRY

(75) Inventors: Thomas A. Seder, Northville, MI (US); Joseph F. Szczerba, Grand Blanc, MI (US); John K. Lenneman, Okemos, MI (US); Roy J. Mathieu, Rochester Hills, MI (US); Shelley Evenson, Boston, MA (US)

(73) Assignee: GM Global Technology Operations LLC, Detroit, MI (US)

( * ) Notice: Subject to any disclaimer, the term of this patent is extended or adjusted under 35 U.S.C. 154(b) by 539 days.

(21) Appl. No.: 12/956,933

(22) Filed: Nov. 30, 2010

(65) Prior Publication Data

US 2012/0135747 A1 May 31, 2012

(51) Int. Cl.
*H04W 24/00* (2009.01)
*H04M 1/00* (2006.01)
*H04B 1/38* (2006.01)

(52) U.S. Cl.
USPC .......... 455/456.2; 455/456.1; 455/456.3; 455/457; 455/566

(58) Field of Classification Search
USPC .......... 455/418–420, 456.1–456.6, 466, 517, 455/550.1, 557, 561, 566, 569.2, 41.2, 90.1, 455/434, 456.1–456.3, 456.5–456.6, 457, 455/556.1–556.2; 348/113, 118; 701/400, 701/408–412, 418, 451, 453–454, 460, 701/467–471, 520, 526–527, 538, 541, 420, 701/433, 437, 440, 444
See application file for complete search history.

(56) References Cited

U.S. PATENT DOCUMENTS

| | | | |
|---|---|---|---|
| 5,654,908 A | 8/1997 | Yokoyama | |
| 5,677,837 A * | 10/1997 | Reynolds | 455/456.3 |
| 6,385,465 B1 | 5/2002 | Yoshioka | |
| 6,633,763 B2 | 10/2003 | Yoshioka | |
| 6,735,516 B1 | 5/2004 | Manson | |
| 7,171,220 B2 * | 1/2007 | Belcea | 455/457 |
| 7,292,935 B2 * | 11/2007 | Yoon | 701/410 |
| 7,646,296 B2 * | 1/2010 | Ohki | 340/539.13 |
| 7,805,246 B2 * | 9/2010 | Chakrapani et al. | 702/5 |
| 7,916,852 B2 * | 3/2011 | Bruce et al. | 379/218.02 |
| 7,933,609 B2 * | 4/2011 | Lagerstedt et al. | 455/456.1 |
| 8,055,440 B2 * | 11/2011 | Shintani et al. | 701/420 |
| 8,107,608 B2 * | 1/2012 | Sheha et al. | 379/207.12 |
| 8,145,417 B1 * | 3/2012 | Chitre et al. | 701/400 |

(Continued)

FOREIGN PATENT DOCUMENTS

| | | | | |
|---|---|---|---|---|
| DE | 19601334 A1 * | 7/1997 | | G01C 21/00 |
| DE | 199 36 568 A1 | 2/2001 | | |
| DE | 100 57 800 A1 | 6/2002 | | |

*Primary Examiner* — Meless Zewdu
(74) *Attorney, Agent, or Firm* — John A. Miller; Miller IP Group, PLC

(57) ABSTRACT

A system and method for entering a destination into a navigation system, usually a vehicle navigation system, that reduces the cognitive load on the vehicle user over known systems. The method includes contacting the destination by any suitable and available manner, such as by a cell phone provided on or in the vehicle, through the internet, through an ad-hoc network, etc., where information concerning the GPS location of the destination is sent back to the navigation system and is displayed on the navigation system screen. If the destination is accurate, the vehicle driver can select that destination, such as by touching an icon on the screen, which would allow the destination entry process to be performed while the vehicle was moving.

19 Claims, 1 Drawing Sheet

(56) References Cited

U.S. PATENT DOCUMENTS

| | | |
|---|---|---|
| 8,160,050 B2 * | 4/2012 | Lee ................................ 370/349 |
| 8,280,406 B2 * | 10/2012 | Ziskind et al. ............. 455/456.3 |
| 2002/0042819 A1 * | 4/2002 | Reichert et al. ............... 709/217 |
| 2002/0065606 A1 * | 5/2002 | Kawai et al. .................. 701/211 |
| 2003/0115288 A1 * | 6/2003 | Ljubicich et al. ............. 709/219 |
| 2003/0202477 A1 * | 10/2003 | Zhen et al. ................... 370/248 |
| 2004/0125776 A1 * | 7/2004 | Haugli et al. ................. 370/338 |
| 2004/0162671 A1 | 8/2004 | Nakajima et al. |
| 2005/0248480 A1 * | 11/2005 | Butler et al. ................... 342/45 |
| 2005/0259658 A1 * | 11/2005 | Logan et al. ................. 370/392 |
| 2005/0278386 A1 * | 12/2005 | Kelly et al. ................... 707/200 |
| 2006/0200310 A1 * | 9/2006 | Kim et al. ..................... 701/209 |
| 2006/0242110 A1 * | 10/2006 | Goldstein ......................... 707/1 |
| 2007/0019227 A1 * | 1/2007 | Hibino et al. ................. 358/1.15 |
| 2007/0162224 A1 * | 7/2007 | Luo ................................ 701/210 |
| 2008/0218405 A1 * | 9/2008 | Eckhart ......................... 342/146 |
| 2008/0288165 A1 * | 11/2008 | Suomela et al. .............. 701/201 |
| 2009/0197617 A1 * | 8/2009 | Jayanthi ..................... 455/456.2 |
| 2009/0204319 A1 * | 8/2009 | Shanbhag et al. ............ 701/201 |
| 2009/0228575 A1 * | 9/2009 | Thubert et al. ................ 709/220 |
| 2009/0291672 A1 * | 11/2009 | Treves et al. ................ 455/414.1 |
| 2010/0255821 A1 * | 10/2010 | Hu et al. ..................... 455/414.1 |
| 2011/0016106 A1 * | 1/2011 | Xia ............................... 707/706 |
| 2011/0111726 A1 * | 5/2011 | Kholaif et al. .............. 455/404.2 |
| 2011/0235550 A1 * | 9/2011 | Adams et al. ................. 370/255 |

* cited by examiner

NAVIGATION SYSTEM DESTINATION ENTRY

BACKGROUND OF THE INVENTION

1. Field of the Invention

This invention relates generally to a system and method for entering a destination into a navigation system and, more particularly, to a system and method for entering a destination into a vehicle navigation system that includes receiving a location signal, such as a GPS signal, from the destination and accepting that destination when it is displayed on a navigation system screen.

2. Description of the Related Art

Navigation systems are well known for use in vehicles, and otherwise, that display the location of the vehicle, typically relative to a roadmap, on a navigation screen, where the location of the vehicle is provided by a GPS receiver. Navigation systems generally allow the user to enter an address into the system as a destination, where the navigation system will then calculate and display a route to that destination from the vehicle's current position. As the vehicle travels along the route displayed on the navigation screen, audio and visual prompts are typically given to the driver to identify turns and other things along the route. The design of navigation systems is continuously being improved to make them more convenient for the driver or other user to use.

Entering a destination into known navigation systems is typically somewhat tedious and time consuming, and puts a rather high cognitive load on the user to enter the required information. For example, entering a destination into the navigation system generally requires entering an address into the system, which typically requires entering a city, a street and a number on the street to identify the location by touching numbers and letters on a touch screen at the appropriate time or prompt. Such a destination entry process requires the user to provide significant concentration on the destination entry task and causes user consternation and frustration because of the time required to complete the destination entry task and the need to fixate on the destination entry task. Thus, it is necessary that the destination entry feature of navigation systems be locked out when the vehicle is moving as a result of the task complexity because of the implications that would otherwise occur if the vehicle driver were entering a destination into the system while driving.

SUMMARY OF THE INVENTION

In accordance with the teachings of the present invention, a system and method are disclosed for entering a destination into a navigation system, usually a vehicle navigation system, that reduces the cognitive load on the vehicle user over known systems. The method includes contacting the destination by any suitable and available manner, such as by a cell phone provided on or in the vehicle, through the internet, through an ad-hoc network, etc., where information concerning the GPS location of the destination is sent back to the navigation system and is displayed on the navigation screen. If the destination is accurate, the vehicle driver can select that destination, such as by touching an icon on the screen, which would allow the destination entry process to be performed while the vehicle was moving.

Additional features of the present invention will become apparent from the following description and appended claims, taken in conjunction with the accompanying drawings.

DETAILED DESCRIPTION OF THE EMBODIMENTS

Figure 1:
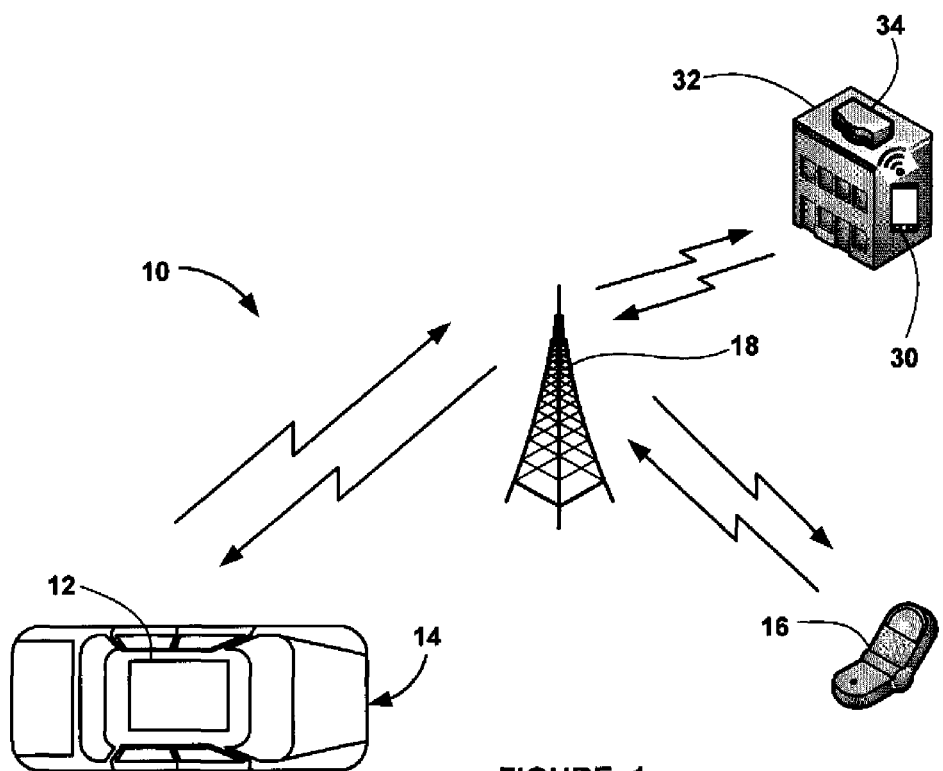
FIG. 1 is an illustration of a system that provides destination entry for a vehicle navigation system using cellular telephones.

The following discussion of the embodiments of the invention directed to a system and method for entering a destination into a vehicle navigation system using a signal identifying the destination's location received from the destination is merely exemplary in nature, and is in no way intended to limit the invention or its applications or uses. For example, the present invention has particular application for a vehicle navigation system. However, as will be appreciated by those skilled in the art, the system and method of the invention may be used for other applications including other navigation system applications or non-navigation system applications.

The present invention proposes a system and method for identifying the location of a destination in connection with a navigation system by transmitting a GPS location to the navigation system from the location. Currently, many devices and systems are able to transmit their GPS location wirelessly, or otherwise, that can be received by the vehicle navigation system. For example, if a cellular phone is included as part of the navigation system, or is in the vehicle, the user can call a cell phone located at the destination, where the cell phone at the destination can send its GPS location to the vehicle navigation system. Systems exist and/or can be set up where the cell phone at the destination location is automated so that it can transmit its location without any input from a person. When the navigation system receives the location signal, that location can be displayed as an icon on a navigation screen for the navigation system that allows the vehicle driver, or other user, to select the icon as the destination that it wants to go to. Thus, it is not necessary for the vehicle operator to enter the address of a location manually into the navigation system following a series of prompts.

The system and method of the invention for receiving GPS signals identifying the location of the destination can be provided by any device or object at the location that is able to broadcast its position. In the future, a geo-spatial web is planned where every object will include circuitry in one form or another for transmitting its location. For example, a group of objects may be part of an ad-hoc internet group that are transmitting signals to a device having the ability to access the internet, from which their location can be transmitted. These objects can connect to the internet connection device via Bluetooth, or other protocol, joining or exiting the piconet as they enter the proximity of the internet connection device. Since the location of the fixed location TCP/IP devices and GPS-enabled mobile TCP/IP devices are known, the location of the objects within the ad-hoc internet group is determinable with high geographic precision.

Further, some locations may have a particular GPS location that is available on the internet, where the vehicle driver can access a directory or the internet through hands free dialing of a cellular phone to have the GPS location transmitted to the navigation system. Other techniques for obtaining the GPS location of an object or the destination itself include WiFi, land-lines, SMS, etc.

FIG. 1 is an illustration of a system 10 that provides navigation system destination entry in the manner discussed above. The system 10 includes a navigation system 12 on a vehicle 14 that includes cellular telephone capability. Through voice activation, or otherwise, the vehicle driver can instruct the navigation system 12 to call a location that the driver wants to drive the vehicle to. In one example, the navigation system 12 uses its cellular capability to call a cellular phone 16 at the location using cellular towers 18. The cellular telephone 16 receives the call from the navigation system 12 and transmits its GPS location back to the navigation system 12. In another example, the navigation system 12 uses its cellular capability and the cellular towers 18 to contact a mobile device 30 located at a site 32 which has a fixed location TCP/IP device 34. The mobile device 30 is communicating with the fixed location TCP/IP device 34 via Bluetooth or some other short range wireless connection. The fixed location TCP/IP device 34 knows its location to be the location of the site 32. The mobile device 30 receives the call from the navigation system 12 and transmits its location— which it receives from the fixed location TCP/IP device 34—back to the navigation system 12.

Figure 2:
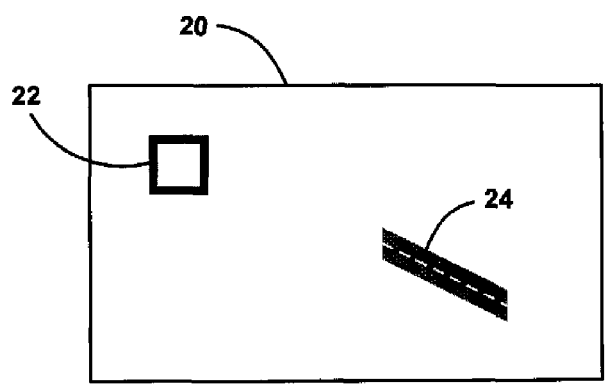
FIG. 2 is a display screen on the vehicle navigation system showing a destination icon provided by a call back from the location and a calculated route.

FIG. 2 is an illustration of a navigation screen 20 for the navigation system 12. When the navigation system 12 receives the GPS information, the location for that GPS information is displayed as an icon 22 on the navigation screen 20. The vehicle driver can see the icon 22 on the screen 20 and can determine whether it is the location where the driver wants to go. The driver can touch the icon 22 to select that destination, where the navigation system 12 will then provide a route 24 from the vehicle's current location to that destination in the same manner that it would if the destination were manually entered. Therefore, the cognitive load on the driver for entering the destination can be reduced and destination entry can be performed while the vehicle 14 is moving.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for entering a destination into a navigation system, said method comprising:
    transmitting a message from the navigation system to an object at the destination;
    receiving the message by the object at the destination and determining that the message is asking for a signal identifying the destination;
    transmitting the signal identifying a location of the object back to the navigation system, where the object has a GPS receiver and the GPS receiver provides the location of the object, and the object is in wireless communications with another device at the destination, the other device provides location data to the object, and the object combines the location data from the other device with data from the GPS receiver in the location of the object that is transmitted back to the navigation system;
    displaying the location on a screen, where the screen is part of the navigation system; and
    selecting the location as the destination.

2. The method according to claim 1 wherein the object is a cellular telephone and the message are cellular telephone call between the navigation system and the object.

3. The method according to claim 1 wherein transmitting the message from the navigation system to an object includes using a cellular telephone at the navigation system's location to transmit a cellular telephone call to the object.

4. The method according to claim 1 wherein the message accesses the internet to determine the location of the destination.

5. The method according to claim 1 wherein the signal includes GPS coordinates of the location of the object.

6. The method according to claim 1 wherein the object is part of an ad-hoc internet group.

7. The method according to claim 1 wherein the object is part of a geo spatial web.

8. The method according to claim 1 wherein transmitting and receiving the message includes transmitting and receiving the messages wirelessly.

9. The method according to claim 1 wherein the navigation system is on a vehicle.

10. A method for entering a destination into a vehicle navigation system, said method comprising:
    using a cellular telephone on the vehicle to call a cellular telephone at the destination;
    receiving the cellular telephone call by the cellular telephone at the destination and determining that the call is asking for GPS coordinates of the destination;
    sending the GPS coordinates of the destination to the cellular telephone at the navigation system, where the cellular telephone at the destination has a GPS receiver and where the GPS receiver provides the GPS coordinates, and the cellular telephone at the destination is in communication with a TCP/IP device with a known fixed location, and the known fixed location of the TCP/IP device is used to refine the GPS coordinates that are transmitted back to the navigation system;
    displaying the destination on a screen that is part of the navigation system, where the destination is displayed as an icon at a location on a map; and
    selecting on the icon on the screen as the destination.

11. A system for entering a destination into a navigation system, said system comprising:
    means for transmitting a message from the navigation system to an object at the destination;
    means for receiving the message by the object at the destination and determining that the message is asking for a signal identifying the destination;
    means for transmitting the signal identifying a location of the object back to the navigation system, where the object location is determined using both location data from a fixed location TCP/IP device with which the object is participating in a piconet and GPS location data from a GPS receiver in the object;
    means for displaying the location on a screen; and
    means for selecting the location as the destination.

12. The system according to claim 11 wherein the message accesses the internet to determine the location of the destination.

13. The system according to claim 11 wherein the object is part of an ad-hoc internet group.

14. The system according to claim 11 wherein the object is part of a geo spatial web.

15. The system according to claim 11 wherein the means for transmitting and receiving the messages transmits and receives the messages wirelessly.

16. The system according to claim 11 wherein the navigation system is on a vehicle.

17. The method according to claim 1 wherein displaying the location on the screen is performed by displaying the location as an icon on a map, and wherein selecting the location is performed by selecting the icon.

18. The system according to claim 11 wherein the means for displaying the location on the screen displays the location as an icon on a map, and wherein the means for selecting the location selects the icon.

19. The system according to claim 11 wherein the piconet is a very small area network such that the location of the object is equivalent to a location of the fixed location TCP/IP device, and the location data from the fixed location TCP/IP device is combined with the GPS location data in order to increase the precision of the signal identifying the destination.

\* \* \* \* \*